Orris E. Albertson
INVENTOR

United States Patent Office 3,386,911
Patented June 4, 1968

3,386,911
WASTE TREATMENT FOR PHOSPHOROUS REMOVAL
Orris E. Albertson, Norwalk, Conn., assignor to Dorr-Oliver Incorporated, Stamford, Conn., a corporation of Delaware
Filed Aug. 3, 1966, Ser. No. 570,017
17 Claims. (Cl. 210—18)

This invention relates to waste treatment for phosphorous removal and more particularly to a combined chemical and biological treatment of sewage for removal of phosphorous to overcome water pollution resulting from growth and subsequent decay of algae. It is particularly concerned with the use of lime for this purpose in such a manner as to greatly reduce the cost of lime used. Ordinary domestic sewage is a rich source of the nutrients required by algae of which phosphorous and nitrogen are the most important. Phosphorous removal offers a practical and effective way of controlling algae growths in most natural waters.

Phosphorous removal may be accomplished by both biological and chemical means. To date, most of these chemical treatment methods have been tertiary treatment processes operating on the biological treatment plant effluent.

The mechanisms of phosphate removal by chemical coagulation is not too well understood. In the case of lime coagulation it appears that the principal reaction is that of precipitation as insoluble calcium phosphate salts, with some additional removal by adsorption at the surface of solids present.

Biological removal is the result of the metabolic removal of phosphorous for cell growth.

An object of this invention is to combine chemical and biological treatment of fluid organic waste material for removal of phosphorous in such a way as to obtain maximum phosphorous removal with the minimum addition of chemical such as lime the cost of which, because of the large quantity of sewage to be treated, tends to be prohibitive.

This object is accomplished in part by initially dosing the raw sewage with a concentration of chemical sufficient to precipitate and coagulate that part of the phosporous which is most efficiently removed by chemical treatment leaving the remaining portion to be removed by biological treatment. It is based on the discovery that chemical treatment is most efficient for the initial phosphorous removal and that it requires more and more chemical dosage per milligram per liter of phosphorous removed as the phosphorous concentration decreases. On the other hand, the rate of biological phosphorous removal is proportional to the rate of cell synthesis which is not a function of the phosphorous concentration as long as there is a sufficiency for cell growth.

Another object is to decrease the amount of chemical required and increase the amount of phosphorous adsorption after chemically dosing the raw sewage, by clarifying, and removing the resulting sludge and recirculaing part of this sludge back into the feed sewage. This has proven to increase the ability to flocculate and decrease the chemical dosage required for phosphorous removal. Flocculation may be used preparatory to the clarification operation to aid in floc growth and subsequent precipitation of the calcium phosphate. Such flocculation is believed also to increase adsorption of phosphorous by increasing the contact between phosphorous containing liquid and solids surfaces.

An important collateral advantage following from this preliminary treatment of sewage with a phosphorous precipitant such as lime which is also a flocculant is the increased BOD removal substantially decreasing the size of subsequent biological stage. This also results in producing a high proportion of primary sludge which is more compactable and easily dewaterable than secondary sludge.

Still another object is to provide, in a combined chemical and biological phosphorous removal system, optimum biological conditions for the removal of phosphorous. This is done by sludge recirculation and high loading of activated sludge in the biological treatment area with short activated sludge retention times, conditions which have been found to produce the maximum biological removal of phosphorous.

Figure 1:
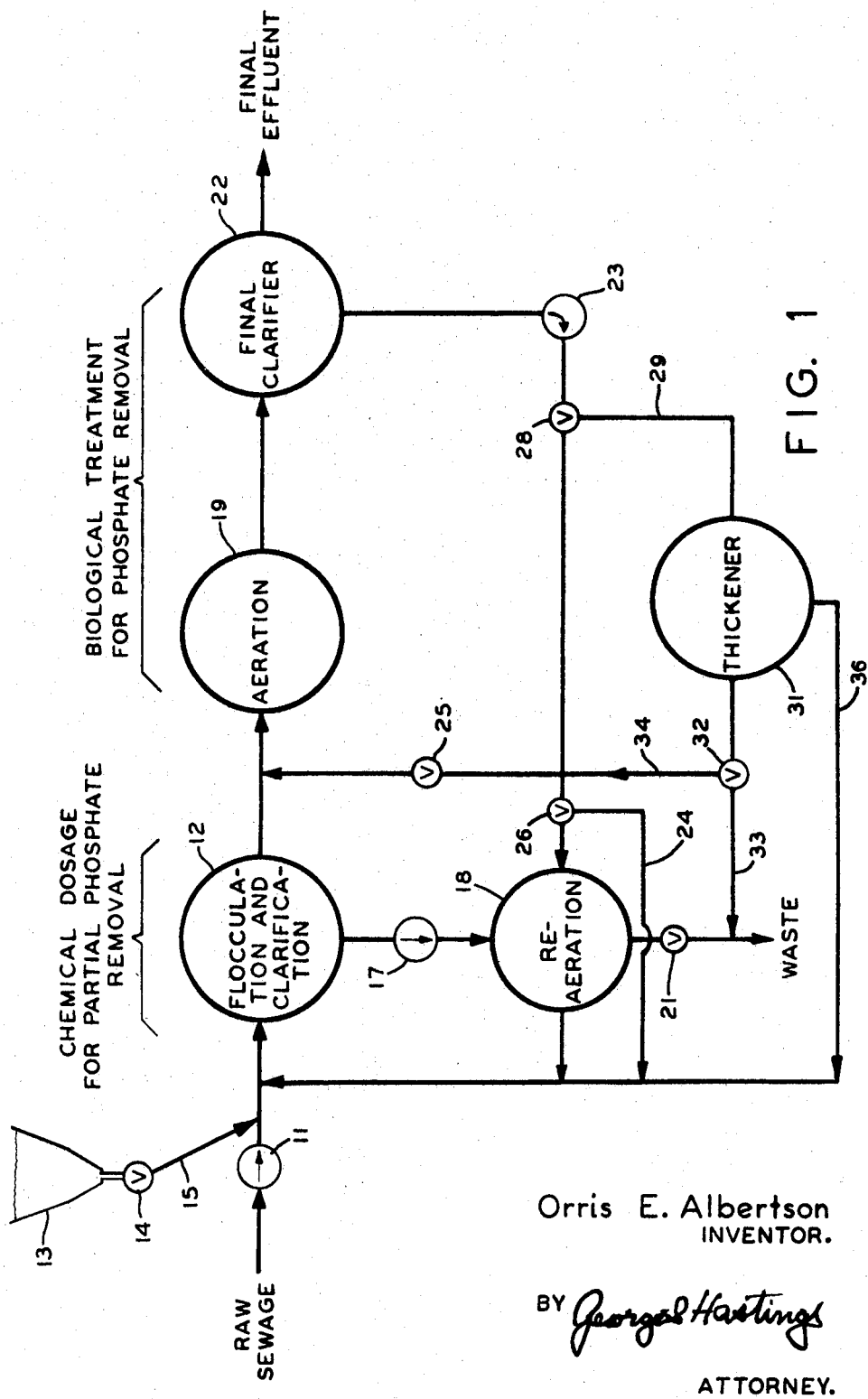
FIG. 1 is a flow diagram illustrating the successive steps in the treatment of raw sewage.

Referring now to FIG. 1, raw sewage is pumped by pump 11 into a combined flocculator and clarifier or sedimentation device 12, which conveniently may be of the construction shown in the patent to Fischer 2,289,112 dated July 7, 1942, though flocculation can be separate from and precede sedimentation.

Lime tank 13 through pump 14 and conduit 15 feeds lime into the mechanical flocculator and clarifier 16 to form calcium phosphate and possibly other insoluble phosphorous compounds depending on the composition of the sewage. The lime also acts to increase flocculation and the formation of sludge by non-phosphorous solids in the sewage thus initially removing a considerable amount of BOD from the system. The sludge from the clarifier and flocculator is pumped by pump 17 into a small aeration tank 18, from which part of the sludge is wasted under control of valve 21. The remainder of the sludge is returned from tank 18 to the flocculator and clarifier to increase flocculation and sedimentation and use of any unused lime in the sludge. Overflow from the clarifier passes on to the main aeration tank 19. Because of the prior chemical removal of BOD and sludge in the clarifier, this aeration tank may be up to 50% smaller than would otherwise be the case with a substantial saving in power for supplying aeration air.

Figure 2:
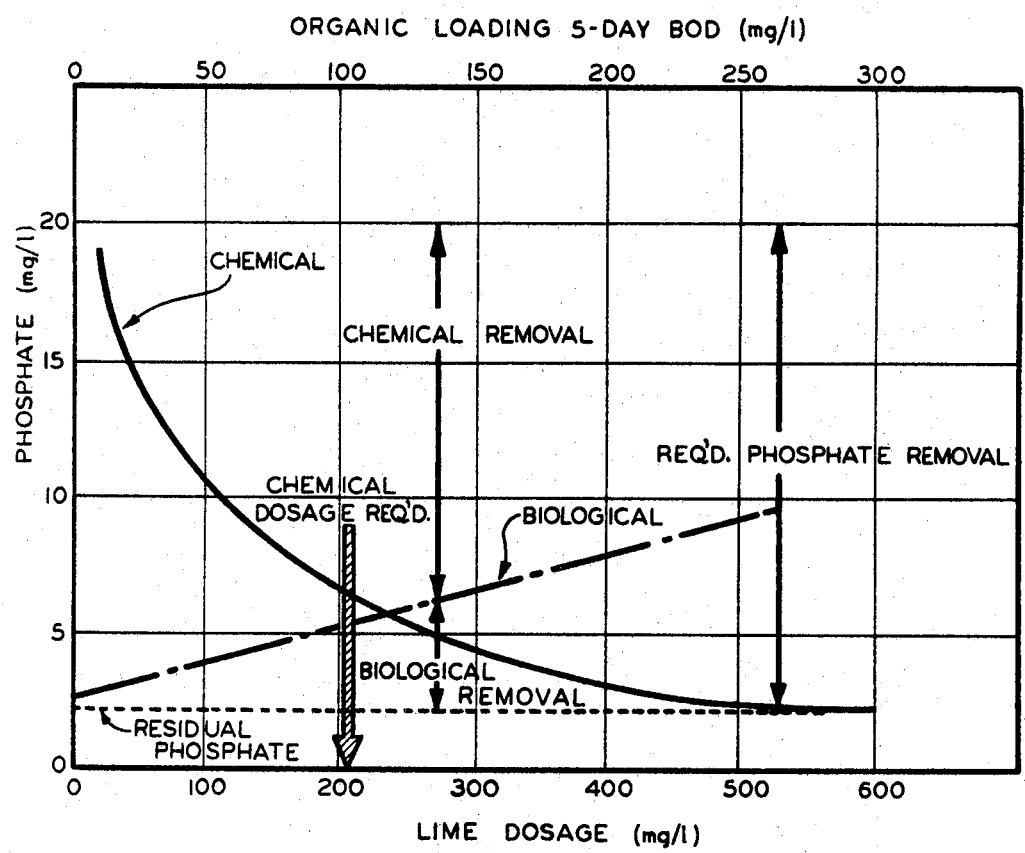
FIG. 2 is a diagram illustrating the effects of residual phosphorous content desired on concentration of chemical dosage and also the relation of biological removal to the residual phosphate content desired.
Figure 3:
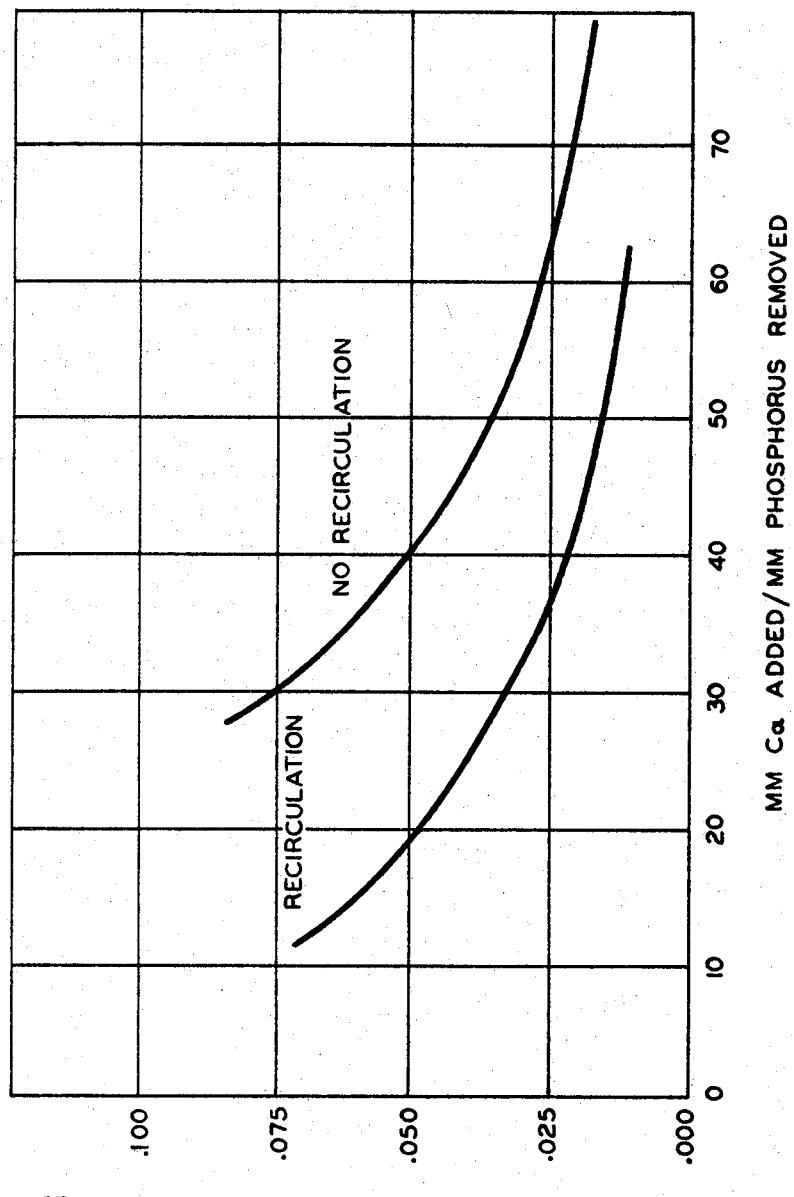
FIG. 3 is a diagram setting forth laboratory results showing milli-mols of calcium required per milli-mol of phosphorous removed, with and without recirculation of sludge to the sewage being dosed.

As shown in the particular example of FIG. 2, lime dosage in the feed liquid to the primary flocculator and clarifier is limited to that which removes approximately 13 mg. of phosphorous per liter of sewage treated, the biological action removing from what is left, approximately 5 mg. of phosphorous per liter, bringing the phosphorous content down to a desired residual of approximately 2 mg. per liter. To produce this result with lime alone in the raw sewage feed would require approximately 400 to 500 mg. of lime per liter.

FIG. 2 shows an example in which 200 mg./l. of lime are used. This will, of course, vary with the composition of the sewage but there will be required an amount of lime necessary to bring the pH to between 8 and 9 and not over 9½. If more lime is used the cost of lime per mg. of phosphorous removed from a liter of sewage becomes disproportionately high and there is the possibility that not enough BOD will be left to carry out biological phosphorous removal. The aerated liquid from the aeration tank 19 is delivered to the second clarifier 22 from which clear final effluent with the desired final residue of phosphorous as set forth in the above example flows to the receiving waters. A major portion of the sludge from the final clarifier, preferably approximately 90%, is fed back to the aeration tank by pump 23 under control of valve 25 for the purpose of highly loading the aeration tank with biologically active sludge. Preferably a sludge age of less than 3 days is provided in the system which has been found most effective in producing metabolic removal of phosphorous by cell growth.

In order to provide minimum retention time of sludge in the final clarifier and maximum biological activity of the sludge, the final clarifier is preferably of the rapid sludge removal type such as disclosed in the patent to Rankin 2,820,758, dated Jan. 21, 1958, in which the sludge material is withdrawn from selected parts of the clarifier as soon as formed for delivery to the aeration tank. The remaining portion of the clarifier sludge which is approximately 10% may be fed to the re-aeration tank 18 and thence to the first clarifier 12. A part sufficient to prevent build-up of sludge in the system is wasted under control of valve 21. A by-pass 24, controlled by valve 26 is provided when conditions make it desirable to feed the sludge from the final clarifier back to the first clarifier-flocculator without re-aeration.

Biological removal of phosphorous through the activated sludge system

In the activated sludge system the oxidation of carbon, hydrogen, sulphur and nitrogen is carried out by microorganisms which retain energy from these reactions for the synthesis of new cellular protoplasm. Rate of nutrient removal, other things being equal, is a function of the rate of cell tissue synthesis and in general is independent of the concentration of phosphorous present. The mixed microbial culture provided by the activated sewage sludge process is an effective biological system in terms of removal of nutrients such as phosphorous.

Biological phosphorous removal efficiencies vary greatly through sewage treatment plants because of composition changes of microbial protoplasm with different sludge ages. Elements are converted to protoplasm and then during aging released into the environment. The highest ratio of phosphorous removed to five day BOD removed normally occurs in the high rate activated sludge system with a low sludge age from one to five days. Thus, by use of a rapid sludge removal system applicant substantially increases the biological removal of phosphorous thus decreasing the amount of lime needed.

The amount of chemical dosage required is more affected by the desired residual soluble phosphorous concentration than the initial phosphorous concentration. FIG. 2 illustrates this, viz. that the smaller the residue of phosphorous the greater the amount of lime required per mg./l. of phosphorous removed. An important part of applicant's invention is the recognition of the economic importance of an optimum combination of biological and chemical removal mechanisms particularly by a chemical such as lime which has excellent sewage solids flocculating ability.

Under normal conditions the process would be programmed for continuous 24 hours' operation leading to a considerable reduction in chemical costs, and an increase in the efficiency of biological waste treatment, by taking advantage of the flexibility of applicant's system to decrease or eliminate lime dosage at night or other times when phosphorous and BOD contents are low, and increase it when they are high. The maximum phosphorous loading tends to occur along with the maximum BOD loading.

The water pollution control field has recognized for several years that one of the primary problems with biological waste treatment systems is the difficulty of handling fluctuating organic loadings throughout the 24-hour day.

The ability to remove the peak organic loadings during the day, thus achieving a more homogeneous microbial system and more constant biological waste treatment efficiency can readily be achieved with applicant's complementary chemical and biological phosphorous removal process. In terms of dollars per million gallons, this permits the most advantageous trade between the cost of providing additional capital and operating costs for the construction of more aeration basins vs. the chemical cost per million gallons of removing the peak BOD loadings during the day.

One common disadvantage to lime tertiary treatment of final effluent is the high pH of the effluent. Most processes studied to date would yield an effluent pH of 10 or higher. In contrast the Dorr-Oliver process creates no additional problems of high effluent pH values. Applicant's integrated system utilizes the carbon dioxide produced by microbial synthesis and respiration in the activated sludge process to reduce the pH from the lime treatment in the primary clarifier, from 9.5 or less to 7 to 8.

Since flocculation greatly aids the production of a calcium phosphate precipitate, the combined flocculator and clarifier unit 12 of said Patent 2,289,112 preferably is used for forcing the particles into contact with each other. A minimum of 15 minutes of flocculation will be normally required to form the insoluble calcium phosphate flocs. Even without the chemical addition the combined device will remove a considerably larger amount of BOD than the standard unit. With lime additions it can be expected to remove up to 60-65% of the BOD. Since a substantially greater portion of the BOD is removed on a primary treatment basis, the aeration basin is sized for this reduction in BOD. Only about 50% of the aeration volume will be required when the BOD removal across the primary unit is 60-65%. This will also result in a 50% reduction in the horsepower required for air.

It is desirable to recirculate a substantial portion of the flocculator and clarifier 12 underflow back to the flocculator feed. Recirculation of the calcium phosphate precipitate in the flocculator and clarifier is beneficial. The particles are believed to provide additional surface area for adsorption of phosphorous, and tend to form larger, easier settling flocs. It may be necessary to re-aerate by re-aerator 18 this underflow in order to prevent odors.

For the purpose of reducing the volume of the sludge part of which may be circulated to the aeration tank and part of which is wasted, as shown at the bottom of FIG. 1, a valve 28, through conduit 29, may by-pass the sludge to thickener 31 from which the sludge is delivered to a valve 32 operable to deliver a selected part or all of the sludge to waste, through conduit 33 and the remainder to conduit 34 for recirculation to aerator 19. In this arrangement the effluent from thickener 31 is delivered through effluent pipe 36 to the influent to the first clarifier.

While applicant has given an example of the application of his invention to a sample of raw sewage, it is applicable to other liquid waste materials. Due to the wire variations in the composition of sewage and other waste material the chemical dosages will need to be increased or decreased to fit greater or less phosphorous content. Applicant has found chemical removal of from 60 to 90% of the phosphorous removed and biological removal for the remainder of the phosphorous removed will produce satisfactory results while resulting in substantial savings in chemicals used.

It is understood therefore that changes may be made in amounts and proportions exhibited in the examples and charts, and in the system described without departing from the scope of the invention which is set forth in the appended claims.

I claim:

1. A combined chemical and biological process for treating liquid organic waste material containing phosphorous, to decrease the phosphorous content to a predetermined minimum concentration, comprising the steps of dosing the raw waste material with a limited amount of a chemical precipitant for phosphorous substantially less than the amount required to remove phosphorous to the predetermined concentration to form an insoluble precipitate of phosphorous; subjecting the dosed waste material to a first sedimentation to separate the material into sludge and an effluent; aerating the effluent to produce phosphorous consuming cell growth, subjecting the aerated effluent to a second sedimentation to remove the phosphorous-bearing biological sludge and produce a final effluent of the predetermined minmium phosphorous concentration.

2. The invention according to claim 1 including the step of recirculating at least a part of said first sedimentation sludge back into the first sedimentation to increase flocculation and utilization of the chemical during first sedimentation.

3. The invention according to claim 2, in which a portion of the sludge from the second sedimentation step is recirculated to the overflow from the first sedimentation to promote biological growth.

4. The invention according to claim 2, in which the raw waste material is dosed with lime.

5. The invention according to claim 2, in which the sludge from final sedimentation is circulated to the overflow from the first sedimentation tank at such a rate as to produce sludge age of less than five days.

6. The invention according to claim 2, in which a portion of the sludge from the first sedimentation is aerated and recirculated to the first sedimentation and a portion of such sludge is wasted.

7. The invention according to claim 2, in which a minor portion of the biologically active sludge from the second clarifier is fed to the first sedimentation to increase flocculation and sedimentation therein.

8. The invention according to claim 2, in which the detention time of sludge in the second sedimentation is reduced by withdrawing the sludge at a plurality of locations at differing radial distances from the center of sedimentation and feeding said sludge to said aerator.

9. The invention according to claim 2, in which the raw waste material is dosed with lime, and in which a portion of the sludge resulting from the second sedimentation step is recirculated to the overflow from the first sedimentation step to promote biological growth resulting in production of $CO_2$ which substantially reduces the high pH produced by the lime.

10. The invention according to claim 1, in which the raw material is dosed with lime to a pH of not more than 9.5 and in which a substantial portion of the biologically active sludge resulting from aeration and second sedimentation is recirculated to the overflow from the first sedimentation step to an extent sufficient to promote biological growth which will result in the production of sufficient $CO_2$ to reduce the pH to between 7 and 8.5.

11. A system for the removal of phosphorus from liquid organic waste material by both chemical and metabolic biological means comprising in combination, means for treating said waste material with a phosphorus precipitating chemical, a first clarifier for clarifying said treated waste material into effluent and sedimentary phosphate bearing sludge, means for recirculating a substantial portion of said phosphate bearing sludge back to said first clarifier, an aerator arranged to act on the effluent from the first clarifier to render it biologically active and thus phosphate consuming, a final clarifier acting on the aerated effluent to produce clarified final effluent and biologically active phosphate containing sludge, and means for wasting part of said sludge and thereby removing phosphorous from the final effluent and the system.

12. The invention according to claim 11, including means for feeding a major part of said biologically active sludge from the final clarifier to said aerator for aeration and recirculation to said final clarifier.

13. The invention according to claim 11, in which means are provided for feeding a minor portion of the biologically active sludge from said second clarifier to said first clarifier to promote flocculation and sedimentation therein.

14. The invention according to claim 11, in which said first clarifier includes means for positively forcing the precipitated particles into contact to flocculate the same.

15. The invention according to claim 11, in which a second aerator is provided for aerating said recirculated phosphate bearing sludge, together with a selectively operable by-pass around said aerator for causing sludge to by-pass said aerator.

16. The invention according to claim 11, including means for recirculating one portion of the active sludge from said second clarifier through said aerator and again into the second clarifier, and means for circulating a second portion of said active sludge through said first clarifier and a waste outlet for wasting sludge from the system.

17. The method of programming sewage treatment to meet varying BOD and phosphorus removal requirements at different times and to reduce varying phosphorus concentrations to a predetermined residual concentration and wherein high BOD tends to accompany high phosphorus content, which comprises, dosing the raw sewage with lime to both precipitate phosphorus and flocculate BOD solids, clarifying dosed sewage into sludge and effluent, aerating and clarifying said effluent to produce activated sludge and a final effluent and recirculating a portion of the activated sludge to the aerating zone to promote biological growth with formation of solids and further reduction of phosphorus content, and adjusting said lime dosage by greater amounts during periods of high phosphorus content and accompanying periods of high BOD and with lesser or zero amounts during periods of lesser phosphorus content and BOD by an amount sufficient when added to the biological removal of phosphorus to hold the phosphorus in the final effluent to the desired residue, and thereby eliminate the need to size portions of the sewage plant for peak BOD loads.

References Cited

Buzzell, J. C., Jr. et al.: Removal of Algae Nutrients From Raw Sewage With Lime, Jour. WPCF, vol. 39, October 1967, pp. R–16 to R–24 (presented as a paper Feb. 27–Mar. 1, 1966).

MICHAEL E. ROGERS, *Primary Examiner.*

MORRIS O. WOLK, *Examiner.*